J. F. O'CONNOR.
SHOCK ABSORBING DEVICE FOR VEHICLES.
APPLICATION FILED OCT. 22, 1914.
1,220,446.
Patented Mar. 27, 1917.
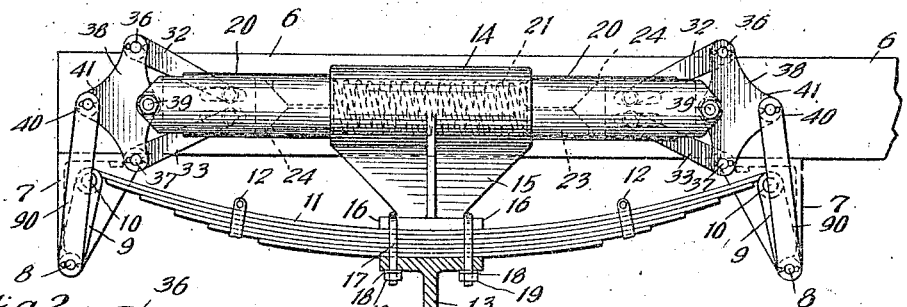
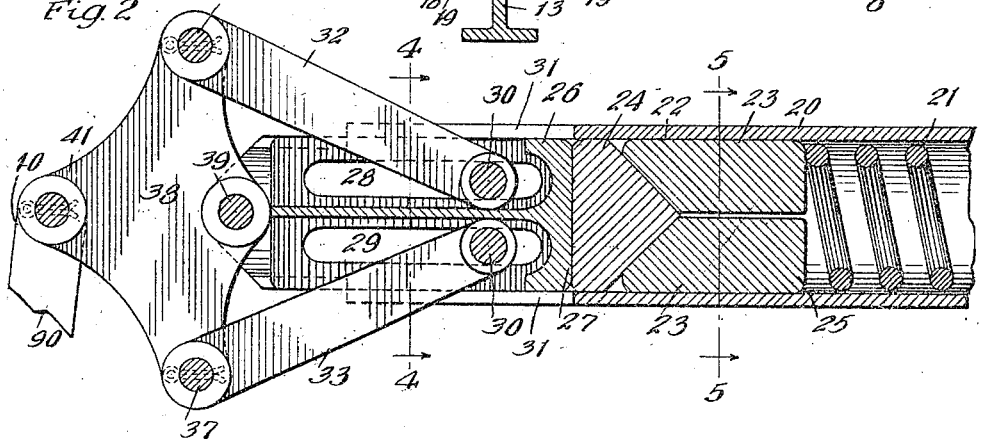
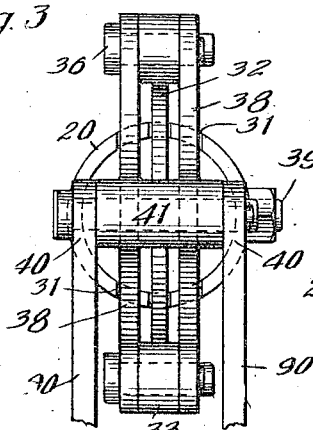
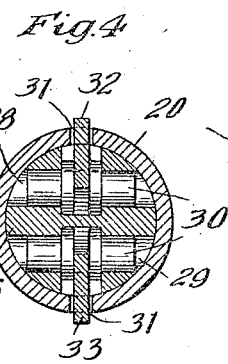
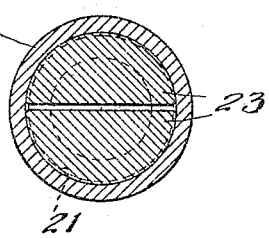
WITNESSES:
INVENTOR.
John F. O'Connor
BY
his ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBING DEVICE FOR VEHICLES.

1,220,446.      Specification of Letters Patent.      Patented Mar. 27, 1917.

Application filed October 22, 1914. Serial No. 867,947.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbing Devices for Vehicles, of which the following is a full, clear, concise, and exact description, reference being had to the accompanying drawings, forming a part of this specification.

My invention relates to improvements in shock absorbing devices for vehicles.

The object of my invention is to provide a shock absorbing device for vehicles of simple construction and efficient operation.

In the drawings, forming a part of this specification, Figure 1 is a side elevation of a shock absorbing device for vehicles embodying my invention. Fig. 2 is an enlarged detail showing one end of the friction casing in longitudinal vertical section and adjacent parts associated therewith. Fig. 3 is a detail showing an end elevation of the cranks and associated levers. Fig. 4 is a cross section taken on line 4—4 of Fig. 2. Fig. 5 is a cross section taken on line 5—5 of Fig. 2.

Referring to the drawings, the numeral 6 indicates a portion of the frame of a vehicle, as for instance, an automobile, to which the shock absorbing device is applied, having dependent therefrom the arms 7—7. To each of said arms 7—7 a link 9 is pivoted as indicated at 8, said links being also pivotally connected, as indicated at 10 to the ends of a leaf spring 11. The latter is preferably provided with spring clips 12—12 and is secured substantially at its center to the axle 13. A spring case 14 is mounted above the spring 11, the same being provided with a downwardly extended flange 15, provided with the shoulders 16—16, the spring 11 being clamped between the axle 13 and the spring case by means of the U-bolts 17—17 passing around the shoulders 16 and provided at the lower ends with suitable washer plates 18—18 and nuts 19—19. The spring case 14 is, in preferable arrangement of the parts, located immediately outside the frame 6 and is provided at either end with a friction shell 20 longitudinally extended therefrom. Within the spring case 14 is mounted the springs 21 and within each friction shell is arranged the friction mechanism 22, consisting of the friction shoes 23—23, and a spreading member or wedge 24 therefor. At their inner ends 25, the friction shoes engage the adjacent ends of the springs 21. Within each friction shell there is disposed a plunger 26 engaging at its inner end 27 against the adjacent wedge 24, the said plunger being provided with upper and lower longitudinally extended slots 28 and 29 respectively, transversely arranged to receive each a pin 30 adapted to slide therein. Near its ends each friction shell is provided with a longitudinally extended vertical slot 31 for the passage from above of a lever 32 and from below of a lever 33, the upper lever 32 having a perforation at its inner end for the passage of the sliding pin 30 therethrough, the lower lever 33 being provided at its inner end with a perforation for the passage of the lower sliding pin 30. At their outer ends the levers 32 and 33 are pivoted respectively to the upper end 36 and the lower end 37 of a bell crank member 38, which is centrally pivoted, by means of the pin 39 passing through the walls of the adjacent shell, to the end of said shell. Levers 90 are pivoted at their upper ends 40 to arms 41 of the bellcranks 38, said levers 90 being pivoted at their lower ends to the brackets 7 as indicated at 8.

The operation is as follows:

The spring 11 flexes in the usual manner upon relative approach or separation of the vehicle body and axle, the changes in length of the spring being accommodated in the usual manner by the link connections 9—9. Upon recoil or relative separation between the vehicle body 6 and axle 13, the pivotal points 40—40 will move upwardly and thereby swing the bellcranks 38 upwardly and inwardly about the pivotal points 39—39. This causes the links 32—32 to move inwardly, thereby forcing the plungers 26 inwardly and actuating the friction wedges and shoes. During this movement, it is apparent that the links 33—33 will move outwardly, which movement is permitted by the pins 30 sliding in the slots 29. Upon downward movement of the vehicle body 6 or relative approach between the same and the axle 13, the bellcranks 38 will be rotated downwardly about the pivotal points 39—39. This causes the inward movement of the links 33—33 which will actuate the plungers 26 and friction devices, as will be understood. Simultaneously, outward movement of the links 32—32 is accommodated by the pins 30 sliding in the slots 28.

It will be readily understood that by changing the curve of the spring 11, the action of the toggle rigging between the ends of the spring and the shock absorbing friction and spring devices may be varied so that on downward movement of the vehicle frame in reference to the axle, the upper levers 32 will force the plungers inwardly and on recoil the lower levers 33 will force the plungers inwardly. I do not intend to limit myself to a spring of a particular type or curvature or any special arrangement thereof, as will appear from the claims hereinafter following. It will be understood that in preferable arrangement two of these devices will be used for each axle, one at either side of the frame of the vehicle.

I claim:

1. In a shock absorber for vehicles, the combination with a vehicle frame, of spaced apart levers pivoted thereto, a spring mounted between said levers, a shock absorbing member connected to said spring intermediate its ends, the shock absorbing member comprising friction shells, friction elements within the shells and springs to resist said friction elements, and a toggle device operatively connecting the friction elements with the said levers.

2. In a shock absorber for vehicles, the combination with the frame of a vehicle, of levers pivoted at one end to the frame, a spring, a friction spring shock absorbing member secured to the said spring intermediate its ends, the shock absorbing member having friction elements and a toggle device, the toggle device connecting the friction elements with the said levers.

3. In a shock absorbing device for vehicles, in combination, a spring case, a friction shell at either end thereof, friction shoes, and a wedge in each friction shell, a plunger in each shell adapted to engage the wedge, a spring, an axle to which both the spring and and the spring case are engaged, pivoted levers, a toggle device connecting each plunger to one of said levers, said levers being each connected at one end to the toggle device and being adapted to pivotally engage the frame of a vehicle at the other end.

4. In a shock absorbing device for vehicles, the combination with a vehicle body and axle, of a spring secured to the axle intermediate its ends a link for each end of said spring, levers pivoted to said body, a bell crank pivoted to each of said levers at one end, a friction shell for each bell crank, friction shoes, a wedge and a plunger adapted to engage the wedge within each friction shell, a pair of links for each bell crank, one at either side of the bell cranks fulcrum, the said links being slidingly engaged to a plunger, a spring case interposed between the friction shells and adapted to support the same, springs to resist the inward movement of each set of friction shoes, the spring case being connected to the axle.

5. In a shock absorbing device for vehicles, in combination, an axle, a vehicle frame, a spring interposed between the vehicle frame and axle, a shock absorbing device secured to the axle and including friction shells substantially parallel to the said spring, friction shoes and wedges within the shells, and toggle members for operating the friction members.

6. In a shock absorbing device for vehicles, in combination, a vehicle frame, an axle, a spring connected to the axle, a spring case and friction shells associated therewith secured to the axle, friction shoes, a wedge and plunger within each friction shell, a spring within the spring case interposed between the friction shoes of the friction shells, a bell crank pivoted to each friction shell, a lever for each bell crank, each lever being pivoted at one end to the bell crank, and at the other end to the vehicle frame, the bellcrank being provided with a pair of levers adapted to alternately actuate the adjacent plunger.

7. In a shock absorbing device for vehicles, in combination, a vehicle frame, an axle, a spring connected to the axle, a spring case and friction shells associated therewith secured to the axle, friction shoes, a wedge and plunger within each friction shell, a spring within the spring case interposed between the friction shoes of the friction shells, a bell crank pivoted to each friction shell, a lever for each bell crank, each lever being pivoted at one end to the bell crank, and at the other end to the vehicle frame, the bellcrank provided with a pair of levers, being each slidingly connected to the adjacent plunger.

8. In a shock absorbing device for vehicles, the combination with a relatively movable vehicle frame and axle and a spring interposed therebetween, of a friction shell secured to the axle and movable therewith, said shell being arranged horizontally and at right angles to the axle, friction elements coöperable with said shell, and means for actuating said friction mechanism in the same direction upon either relative approach or separation of the vehicle frame and axle.

9. In a device of the character described, the combination with two relatively movable members having a spring interposed therebetween, of a friction shock absorbing device mounted on one of said members, and means for operating said friction device in the same direction upon either relative approach or separation of said members, said means including a bell-crank, pivoted links, a plunger, and a lever for oscillating said bell-crank.

JOHN F. O'CONNOR.

Witnesses:
    CARRIE G. RANZ,
    ELIZABETH M. BRITT.